Aug. 26, 1958     E. P. McCREERY ET AL     2,849,004
CORN SHELLING APPARATUS

Filed March 11, 1955     2 Sheets-Sheet 1

INVENTORS,
EDWARD P. McCREERY &
BY MILO F. ARMS

Oberlin & Limbach
ATTORNEYS

INVENTORS,
EDWARD P. McCREERY &
BY MILO F. ARMS

Oberlin & Limbach
ATTORNEYS

United States Patent Office 2,849,004
Patented Aug. 26, 1958

2,849,004

CORN SHELLING APPARATUS

Edward P. McCreery, Lakewood, and Milo F. Arms, Parma Heights, Ohio, assignors to The C. O. Bartlett & Snow Company, Cleveland, Ohio, a corporation of Ohio Application March 11, 1955, Serial No. 493,697

3 Claims. (Cl. 130—6)

This invention relates as indicated to apparatus for shelling ear corn and, more particularly, to improvements especially suited for use with shellers of the type shown in the copending application of Edward P. McCreery, Serial No. 381,558, filed September 22, 1953, now Patent No. 2,754,827, dated July 17, 1956.

In such prior application, there is disclosed a corn sheller improved in a number of structural respects and thereby possessed of advantages not afforded by previously known shellers, principal among which are a considerable increase in capacity and substantially complete separation of the grains of corn from the cobs and husks. This sheller is so designed that the shelled corn falls by gravity from the bottom of the unit along substantially the entire length thereof, while the cobs and husks are ejected through an opening provided in the end wall at the discharge end of the sheller. A cob blower has its inlet side connected through a pneumatic trap to the discharge opening of the sheller and is operative to draw in an expell the cobs and husks through suitable piping to bins and the like. The shelled corn is generally deposited upon a conveyor extending to removed points for subsequent processing or handling.

In many cases, it is desirable to clean the shelled corn by removing dust and other small pieces of trash therefrom and, where desired, this is generally more economically accomplished in the shelling apparatus. It is accordingly a principal object of our invention to provide a corn shelling installation adapted not only to shell the ear corn and effect separate discharge of the cobs and husks, but to remove such foreign matter from the shelled corn in a novel and efficient manner.

A further object is to provide corn shelling apparatus comprised of sheller, cob removal and shelled corn cleaning units mechanically and functionally related such to provide a new combination thereof.

It is also an object of our invention to provide such a combination wherein the several units are so structurally constituted as to be extremely flexible in their spatial orientation without impairment of their combined efficiency, whereby the physical arrangement may readily be adapted to suit best particular space and operating requirements.

An additional object is to provide a shelled corn cleaner of novel and improved design.

Another object is to provide such a cleaner of unitary structural nature permitting it to be easily attached to and used with existing shellers.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
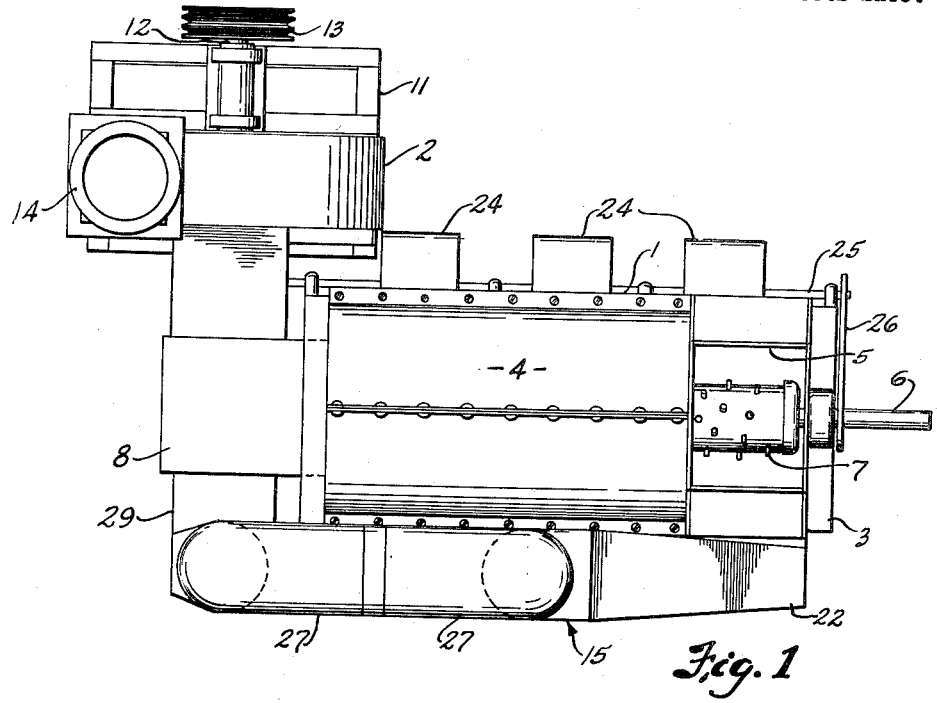
Fig. 1 is a top plan view of corn shelling apparatus in accordance with the present invention.
Figure 2:
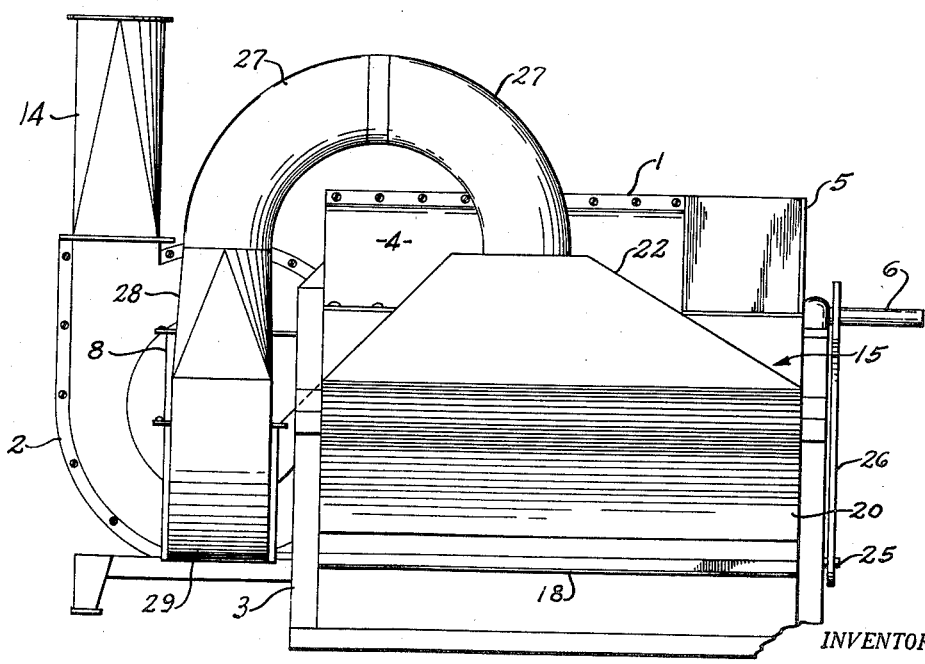
Fig. 2 is a side elevational view thereof.
Figure 3:
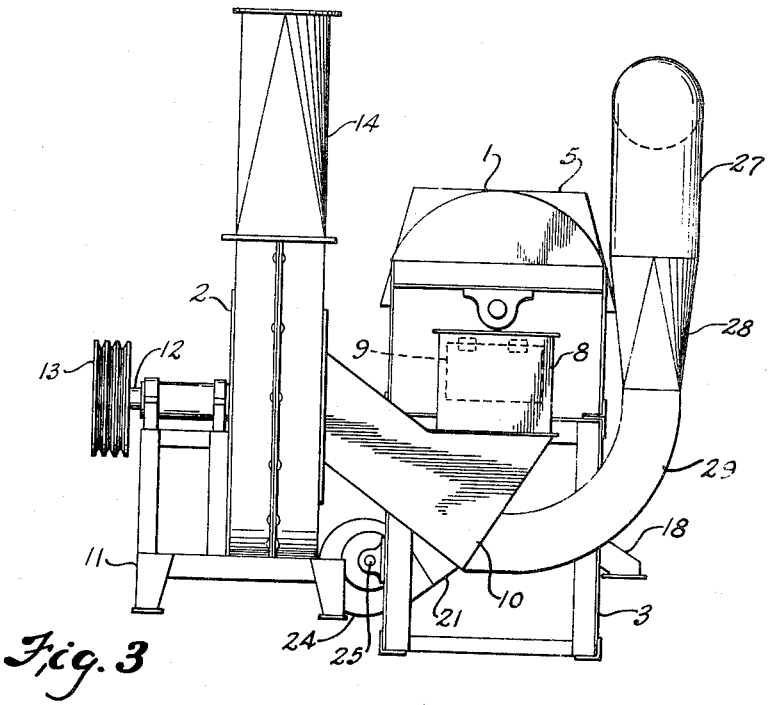
Fig. 3 is an end view of the apparatus, looking from the left in Figs. 1 and 2.

Referring now to the drawings in detail, the apparatus illustrated comprises a corn sheller 1 and cob blower 2 both of the nature disclosed in the aforementioned copending application, Serial No. 381,558. Since the constructional details of these two units are fully illustrated and described in said application, they will be here described only to the extent necessary for a proper understanding of the present improvements. Reference may, of course, be had to the prior disclosure, if desired, for full knowledge of the inner workings of these units.

The sheller 1 is supported by a frame 3 and has an outer generally cylindrical jack 4 which is open at the bottom to permit the shelled corn to fall therefrom by gravity over substantially the entire length of the sheller. An ear corn hopper 5 is provided at the top of the unit at one end and a shaft 6 projects from such end for connection to a suitable drive means, not shown. The shaft, of course, rotates the inner cylinder or rotor 7 which is operative to shell the ears.

At its other end, the sheller is provided with a discharge opening leading to an enclosure 8, the cobs and husks being ejected into this enclosure through a door indicated at 9 as set forth in application Serial No. 381,558. Also as described in such application, a chute 10 of angle form extends between the enclosure 8 and the cob blower 2. The latter is mounted on a separate stand 11 and equipped with a drive shaft 12 on which pulleys 13 are mounted for drive of the blower. It will be seen that the material discharged from the sheller falls downwardly into the shorter leg of chute 10 and is subjected to a cross-current of air flowing upwardly through the longer chute leg to the blower. Such air flow is sufficient to carry the cobs and husks to the blower, but the reversal is too sharp for the carrying forward of any rocks, tramp iron and the like in the discharged mass. Accordingly, such heavy foreign material falls to the bottom of the chute; suitable access may be provided, for example, by a door or removable panel, for convenient removal of such material. A transition conduit section 14 extends from the blower outlet for connection to suitable piping through which the cobs and husks are delivered to bins therefor.

Figure 4:
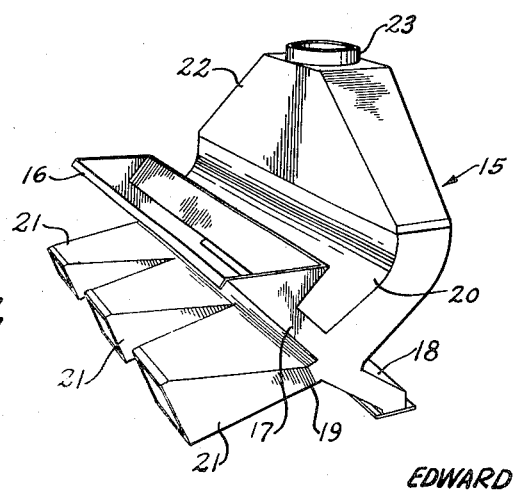
Fig. 4 is a perspective view of the shelled corn cleaning unit included in the complete apparatus.

With reference now particularly to Fig. 4, we have devised a shelled corn cleaner, designated generally by reference numeral 15, adapted to remove dust and other trash falling from the sheller with the grains of corn. The cleaner is, as illustrated, a unitary device comprising a receiving hopper portion 16 of a length such to extend completely over the bottom discharge opening of the sheller, the unit, of course, being positioned so that all the shelled corn falls into this hopper. The corn passes from the hopper, having an enlarged mouth, through a downwardly inclined passageway 17 for ultimate discharge through a slightly offset chute 18. Sections 17 and 18 are not only longitudinally offset but separated by duct work forming at one side an air inlet 19 and at the other side an expansion chamber 20 of much larger cross-sectional area than the inlet section.

Extending away from the inlet section are three air jet ducts 21 through which air is delivered from separate blast fans, the air being united in the inlet section 19 to form a continuous blast across the length of the space through which the corn falls in passing from the hopper to the discharge chute. The air in entering the expansion chamber 20 undergoes a drop in velocity sufficient to drop the shelled corn while carrying forward dust and trash. The chamber 20 is curved upwardly and communicates with a collector section 22 having a trash discharge opening 23 at its top.

In assembled relation with the sheller and cob blower, the cleaner 15 is, as indicated, disposed with its hopper 16 underneath the sheller and extending therealong to catch the shelled corn as discharged from the sheller. The ducts 21 are supplied air blasts from a series of three blast fans 24 arranged on the sheller frame at the side opposite that at which the main body of the cleaner is disposed and, for convenience, the fans are driven by a single shaft 25 having a drive connection with the main shaft 6 of the sheller through a belt 26 and suitable pulleys.

Suction must be applied to the expansion chamber to draw out the trash and air therefrom and this is accomplished very efficiently by connecting the cleaner trash discharge to the cob and husk chute 10 which leads to the cob blower. Such connection comprises a pair of elbows 27 of cylindrical section, a transition section 28, and an elbow 29 of rectangular section, together comprising a continuous passageway from the top of the cleaner to the lower end of the discharge chute 10. The cob blower thus serves the further purpose of effecting removal of the light foreign matter extracted from the shelled corn, with all refuse being delivered to its discharge point through the same means.

If it is desired to keep the dirt and trash collected in the cleaner from the cobs and husks, the trash discharge of the cleaner may be connected to a separate blower effective to apply the necessary suction to the expansion chamber 20. The construction of the cleaner clearly permits it to be operatively associated with an existing sheller of the general type discussed and may further be arranged at either side of the sheller as desired. In fact, the use of separate frames for the three main units, that is, the sheller, cob blower and cleaner, affords numerous spatial arrangements thereof.

While we have indicated the corn sheller to be preferably of the type disclosed in application Serial No. 381,558, it will be seen that the improved combination of our invention may be realized with shellers of other specific nature. Regardless of such details, it will be noted that air and trash are not discharged freely into the atmosphere, but are conveyed within a closed discharge system. Moreover, such system preferably employs the blower for handling the cobs and shucks to discharge the cleaning fan air.

Other modes of applying the principle of the invention may be employed, change being made as regards the details described, provided the features stated in any of the following claims, or the equivalent of such, be employed.

We therefore particularly point out and distinctly claim as our invention:

1. In corn sheller apparatus including a sheller unit having an ear corn feed hopper at one end and a cob and husk discharge opening at the other end, corn shelled therein being discharged along the bottom of the unit, and a cob blower connected to such discharge opening of the sheller unit; a shelled corn cleaner disposed adjacent the sheller unit, said cleaner having a receiving hopper portion into which the shelled corn falls, a discharge chute through which such corn is expelled from the cleaner, means forming a downwardly extending passageway connecting the hopper portion and discharge chute for directing the falling corn from the former to the latter, fan means, duct means extending from the outlet of said fan means to a side wall of the passageway and being of decreasing cross-sectional area in such direction, said duct means terminating in a relatively narrow discharge opening in such side wall of the passageway with the air supplied therethrough being directed transversely across the passageway, means defining an expansion chamber extending from an opening in the other side wall of the passageway opposite such discharge opening and of considerably greater cross-sectional area than the same, the air flowing across the passageway entering such chamber and there undergoing a reduction in velocity sufficient to cause dropping of corn entrained in the flow, such flow thereby effecting separation of dust and the like from the shelled corn, and conduit means connecting said expansion chamber to the inlet of said cob blower, whereby the latter draws in air from the cleaner and expels dust therein along with the cobs and husks.

2. In combination with a corn shelling unit adapted to discharge shelled corn throughout its longitudinal extent, a unitary cleaner structure for effecting removal of relatively light trash mixed with the shelled corn, said structure comprising an elongated hopper co-extensive with the shelling unit and adapted to receive the shelled corn, a discharge chute through which such corn is expelled after cleaning, means forming a downwardly extending passageway through which the corn may fall from the hopper to the discharge chute, the latter and such passageway being of approximately the same longitudinal extent as the hopper, an air inlet at one side of the passageway substantially coextensive therewith, means defining an expansion chamber at the other side of the passageway in opposition to and of considerably greater cross-sectional area than such inlet, a plurality of supply ducts arranged jointly to communicate with the inlet over the length thereof, each such duct being of outwardly increasing section and having a connection at its outer end with a blast fan, high velocity air thereby being caused to flow across the passageway through which the shelled corn is conducted and into said expansion chamber, the velocicty being so reduced in the latter as to cause dropping of the corn thereby to separate the same from such light trash, and blower means for applying suction to the expansion chamber to remove the air and trash therefrom.

3. The combination set forth in claim 2 wherein said shelling unit has a cob discharge aperture, and said blower means is a cob blower connected both to such aperture and to the expansion chamber of the cleaner structure.

References Cited in the file of this patent

UNITED STATES PATENTS

| 565,926   | Rowe       | Aug. 18, 1896 |
| 2,120,641 | Dieterich  | June 14, 1938 |
| 2,380,295 | Crumb et al. | July 10, 1945 |
| 2,443,031 | Gerber     | June 8, 1948 |
| 2,754,827 | McCreery   | July 17, 1956 |

FOREIGN PATENTS

| 701,169 | Great Britain | Dec. 16, 1953 |